Patented Mar. 16, 1948

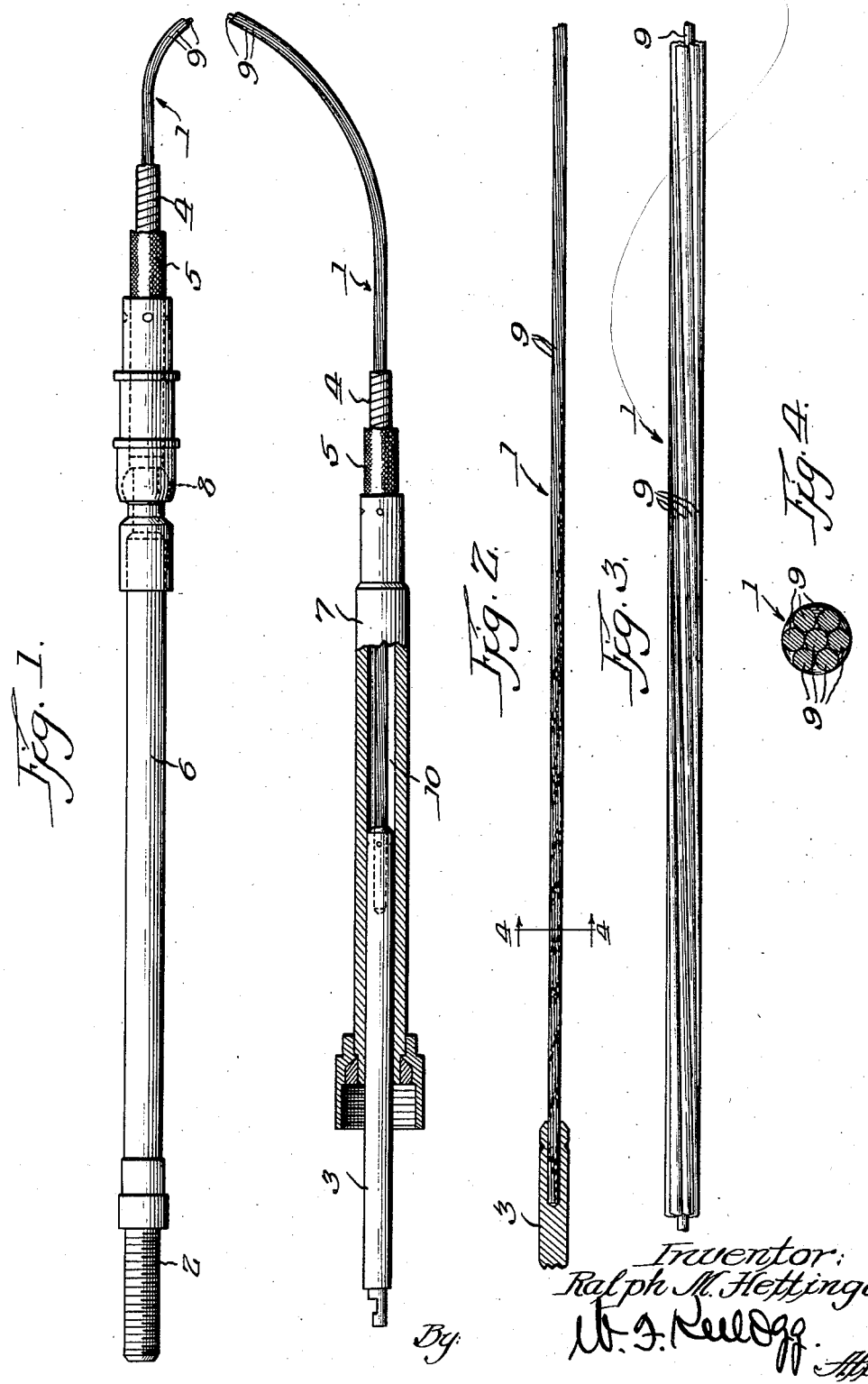

2,438,053

UNITED STATES PATENT OFFICE 2,438,053

MOTION TRANSMITTING DEVICE

Ralph M. Hettinga, Kalamazoo, Mich., assignor to Shakespeare Products Company, Kalamazoo, Mich., a corporation of Michigan Application March 5, 1945, Serial No. 581,152

4 Claims. (Cl. 74—501)

This invention relates to improvements in control devices, and more particularly, to a push-pull motion transmitting member therefor, so fabricated as to afford materially greater tensile strength and compression resistance, as well as a minimum of stretch, when employed in an appropriate casing for the linear transmittal of control motion from one point to another.

It is also an object of the invention to provide a motion transmitting member of durable, novel and simple construction, capable of efficient use in but a single flexible casing for pushing considerable loads, as well as for pulling the same, all without the need or use of a heavy supporting casing, such as is required for the usual twisted cable motion transmitting members.

Furthermore, it is an object of the invention to provide a motion transmitting member for control devices of the indicated character, which, because of its character of construction or fabrication, will make for the production of control device assembiles having considerably less over all diameter, bulkiness, weight, and number of working parts, and afford greater adaptability for installation.

Yet another object of the invention is to provide a push-pull motion transmitting member which, when made a component part of a control device, will effect a material and most important reduction of the number of parts heretofore required in the making of control devices and, in consequence, effect highly desirable economies as to material requirements, over-all production costs and labor demands.

The invention also aims to provide a motion transmitting member affording great pushing or compression strength, even when unsupported in a control assembly, over that distance due to the normal operational stroke of the control, thus ensuring an accurate and faithful transmission of control motion.

The invention also aims to provide a push-pull motion transmitting member or cable wherein the component elements thereof are so relatively arranged as to permit the use of hard tempered wire without materially detracting from its flexibility, and hence, greatly reduce the stretching thereof with the application of pull or tensile loads thereto and, to a large extent, eliminate ballooning of the wires with the application of compression or push loads thereto, because of the tendency of the hard tempered wires, through inward tension and disposition, to retain themselves in closely assembled relation.

Furthermore, it is an object of the invention to provide a device of the character stated in which the lay of the covering wires is such as to effect smoother sliding or other movement of the same through or over a body contacting therewith, thus, advantageously reducing friction and wear to a minimum, and additionally, permitting the transmittal of an even and uniform motion therefrom, in sharp contrast to the uneven and jerky motion and motion transmittal of a conventional inner member of coiled wire encasing a twisted wire cable.

I am aware of the fact that, heretofore, many different forms of cables, etc., for use in the transmission of push and pull forces in control and other devices, have been produced. As regards such cables, etc., adapted for use in control motion transmitting devices, the majority, if not all thereof, require special casings and special assemblies, in order to become operative with any degree of accuracy and satisfaction. Additionally, these cables must be provided with bodily disposed windings or casings appropriately joined to and movable therewith in order that compression loads or push forces may be handled by and transmitted from the same. The casing or winding equipped cables must then be slidably received in flexible conduits or casings substantially throughout their lengths. Such constructions, manifestly, entail the use of considerable material, labor and time for their production, and also, they are objectionably bulky, cumbersome and heavy. In many instances, their cable or push-pull motion transmitting members are inefficient in numerous ways, amongst which may be mentioned the fact that too great stretching and ballooning or buckling thereof occurs with the application of pull or push forces (tensile or compression loads) respectively, thereto, with resultant and possibly hazardously inaccurate transmission of control motion therefrom to an equipped controlled apparatus or device.

Through my improved cable or motion transmitting member, I provide the art with a dependable, durable and structurally simple device by means of which, the size and weight of a control device provided therewith, will be kept at minimum because of the elimination of the various parts, and which, because of its construction, will make it possible to smoothly and, generally, over all satisfactorily transmit both tensile and compression loads without motion loss and with considerably smoother friction resistance (spotty or continuous).

It is, of course, to be understood that whereas I have hereinbefore referred to my improved device as being a motion transmitting member for control devices, I do not intend that its application or range of usage shall be limited thereto. The device, by reason of its construction is capable of being used, with great advantage and satisfaction, as a cable or rope per se, i. e., a force or stress transmitting or distributing member, as hereinafter described.

The foregoing, as well as other objects, advantages, and meritorious teachings of the invention, will be in part obvious and in part pointed out in the following detailed disclosure thereof, when taken in conjunction with the accompanying drawings, it being understood that the particular form of the invention presented herein is a precise and, what is now considered to be, the best mode of embodying its principles, but that modifications and changes may be made in the specific embodiments, without departing from its essential features.

In these drawings:

Figure 1 is a side elevation, partly in longitudinal section with parts broken away, of a control device constructed in accordance with my invention.

Figure 2 is a fragmentary side elevation of the motion transmitting member and one of the end rods provided thereto.

Figure 3 is an enlarged side elevation of a portion of the motion transmitting member illustrating approximately one-half of a complete convolution of the helically laid wires constituting the same, and Figure 4 is an enlarged transverse section taken on the line 4—4 of Figure 2, looking in the direction in which the arrows point, showing the relative arrangement of the core or center and covering strands constituting the motion transmitting member.

Having more particular reference to the drawings, in connection with which like reference characters will designate corresponding parts throughout, the motion transmitting member, forming an essential part of my invention, is indicated, in its entirety, by the numeral 1. Said member is composed of a plurality of hard tempered spring wires of satisfactory gauge laid helically about and along a core strand or wire, all of which are hereinafter more fully described. The ends of the wires constituting the motion transmitting member 1 are staked or otherwise fastened securely to end rods 2 and 3 and the member is slidably and somewhat snugly received in and through a flexible supporting casing 4.

The casing 4 is formed of helically wound flattened tempered wire, whose coils, as will be observed upon reference to the accompanying drawings, are of relatively short pitch. This particular construction may, however, be changed or modified, insolong as the same affords sufficient flexibility plus adequate support for the motion transmitting member 1, especially, when it is subjected to compression loads.

A fabric or other suitable and flexible form of covering 5, is provided about the casing 4, preferably, throughout its length.

The opposite ends of the motion transmitting member 1, which are connected to the end rods 2 and 3, are extended from the adjacent ends of the casing 4. Tubular fittings 6 and 7 are secured to the ends of said casing and snugly and slidably receive the rods 2 and 3 therein.

If desired, the tubular fitting 6 can be of sectional construction and its outermost section swivelly connected to the casing and fabric engaged one, as at 8. Thus, pivotal movement of said outer section, with respect to the remaining section, will be permitted for more satisfactory or convenient operation of the end rod 2. By the same token, a swivel equipped tubular fitting of the character just indicated, may be substituted for the fitting 7 receiving the end rod 3, should this be desired or required.

The motion transmitting member 1, as aforesaid, is composed of a plurality of hard spring wire strands 9 of high tensile strength and substantially the same length, though the covering strands are slightly longer than the core strand to compensate for their hereinafter described helical disposition about the latter. In the instant embodiment of the invention, seven strands 9 are shown as constituting the motion transmitting member. The number may, of course, be increased or decreased. Of these strands, one serves as a center wire or core. The remaining six strands are so relatively disposed as to be arranged in juxtaposed covering relation about the core strand. Following said disposition of the covering wire strands, they, and the core strand, are collectively staked or secured as a symmetrical group at certain of their adjacent ends to an end rod 2 or 3. The staking or securing of the wire strands, including the core strand, retains each strand end in fixed relation to the remaining ones, with the result that no individual strand can move either axially or in a rotary manner with relation to any other strand of the group. Thereupon, and while the just described end of the thus composed motion transmitting member is held firmly against rotation, its remaining end is received by a chuck (not shown) or other suitable tool, and the six covering strands are firmly connected thereto. The chuck is now rotated whereby a complete turn of the same for approximately eight inches of length of the motion transmitting member is made. In this manner, the covering wire strands 9 will be helically laid about and along the center wire or core strand at a relatively long pitch. The second or chuck engaged end of the motion transmitting member is then fixedly secured to a second end rod (2 or 3) in the same manner and relation as the first mentioned member end was secured; hence, retaining the individual wire strands at said second end against axial or rotating relative movement.

Because of the fixed securing of the opposite ends of the strands 9 to the end rods 2 and 3, as described, the motion transmitting member 1 will retain a form wherein the covering wires effect a complete helical turn in each approximately eight inches of length thereof. It will be noted, however, that no one of the covering strands 9, i. e., those strands arranged in juxtaposed circumferential relation about the core strand, will have a set twist of any degree or character imparted thereto, other than the aforesaid helical laying about and along the core strand, inasmuch as all of the motion transmitting member component strands are formed of hard spring wire and, in consequence, the helically wound covering strands exert a moderate tension, the tendency of which is to effect a return to the normal parallel original or initiating form with relation to each other and the core strand, thus constituting a non-setting tension. Such a return, however, is prevented because the group of six covering wire strands 9, when arranged and secured as described, revolve or auto-adjust themselves in relation to each other intermediately, only, of their opposite and secured or fixedly interconnected ends. Any tendency of the individual covering strands 9 to have a torque twist, will be of no detriment to the motion transmitting member assembly and/or its efficiency, because the helical pitch thereof about and along the core strand is so moderate that slight twisting of said covering strands results in a more complete or close binding or relationing of the group into a more efficient unit for push as well as pull motion transmittal.

In usage of a control device constructed in accordance with the teachings of my invention, it will be understood that the motion transmitting member 1 is slidably received through the flexible helically coiled casing 4, whereupon end rods, such as indicated by the numerals 2 and 3, are secured to the opposite ends of said motion transmitting member. Tubular fittings 6 and 7 are appropriately provided the opposite ends of the flexible helical casing 4 with its flexible protecting covering 5, and the end rods 2 and 3 are slidably received in and through these tubular fittings. The outer ends of the connecting rods, which extend from or beyond the adjacent ends of their respective tubular fittings 6 and 7, are suitably provided, in one instance, to permit the engagement of a knob, handle or motion imparting means thereto, and in the other instance, its operative connection to a device adapted to receive push-pull motion from the control device, i. e., the motion transmitting member 1.

It is obvious that the character of use of the improved control device is multifold. In general, it is to be employed for transmitting, optionally, push or pull motion from one point to another, possibly remote thereto, and if required, through tortuous, angular, curved or otherwise irregular paths of travel.

A control device provided with my improved motion transmitting member will attain and maintain high operational efficiencies when used to transmit compression or push loads offering considerable resistance. Additionally, the motion transmitting member will be able to push considerable loads without the use of a heavy supporting casing, as is required by the now prevalent types of twisted cables, which, as will be understood, can only pull, unless they are provided with an interconnected unit assembly component casing engaged about and along the same whereby compression loads may be exerted. It will also be appreciated that a control device provided with the improved motion transmitting member will efficiently transmit pull motion from its receiving to its transmitting end.

The pushing strength of my improved motion transmitting member, when unsupported as through a casing 4, is especially advantageous in controls at those points where the member is unsupported for a short distance, due to the normal motion transmitting stroke of the member, when extended within a tubular end fitting, as indicated at 10 in the accompanying drawings.

The motion transmitting member eliminates stretch incident to pull loads imposed thereon to a much greater extent than will devices heretofore provided. The long pitch of the helically wound covering strands 9, about the core strand, is partly responsible for this quality, and it is important to note that this long pitch is made practical by the method of production of the member, permitting the use of harder tempered wire, and yet, have an effectually and satisfactorily flexible cable, and moreover, a cable which will resist ballooning of its component strands at those times when heavy compression loads are imposed thereupon.

By reason of the free disposition of the intermediate portions of the various helically wound covering spring wire strands about the core strand, the former strands will be capable of moving more freely with relation to each other and the core strand than would be the case with ordinary closer or shorter pitch cable. The long pitch of said strands is largely responsible for this quality. Thus, the covering strands are auto-adjustable or self-adjustable with relation to each other and the core strand at such times when it becomes necessary to flex (simple, compound or reverse) the member body, and in this manner, assure the efficient transmittal of accurate or faithful push or pull motion therethrough and therefrom. Additionally, this free movement arrangement of the intermediate portions of the covering strands will provide the motion transmitting member constituted thereby with greater flexibility without the loss of any of its linear motion transmitting efficiencies.

Because of the long gradual pitch of the helically wound covering strands 9 about and along the core strand, it necessarily follows that a smoother sliding motion transmitting member is provided, as there are no cross-wire indentations in or throughout its body to produce friction and/or abrasion with sliding engagement over the short pitched coils of the outer casing 4 or any other similar conventional type of casing. It will be readily understood that the roughness produced by the interlocking of the coils of the conventional type of inner cable or motion transmitting member with the coils of a conventional type of casing materially increases with a load, and in consequence, causes a jerky resistant action, as against the smooth flowing action of my improved motion transmitting member.

While I have hereinbefore described, with some degree of particularity, the cable or member 1 as being a motion transmitting member for usage in connection with control devices, it is to be expressly understood that said cable may be satisfactorily and successfully used in many other manners, and in particular, in manners corresponding to the over-all range of use of wire strand cables.

In illustration of the merit of this new cable invention, it can be advantageously employed as a force or stress transmitting or distributing member instead of a motion transmitting member, as aforesaid, i. e., a member such as used in bridge construction work, or for stays and similar bracing construction mediums, where just holding or securing things in place, without the need and/or necessity of frequent adjustment, is important. Such, and kindred types of other usages of the cable are, obviously, well and practicably within the ambit of the invention because of the cable possessed quality of less elongation or stretch due to the long pitch lay of its strands and their body formations.

As hereinbefore generally noted, it is to be understood that the number of component strands of the improved member or cable 1, may be varied. The number of such strands may be increased or decreased to more or less than seven (shown in the accompanying drawings). Where more flexibility of the cable is required, a greater number of strands of less or varying gauge may be employed in its fabrication. Where greater stiffness of the cable is desired, a lesser number of strands of greater and possibly, varying gauge, may be employed in its construction. By the same token, it is possible and practical that the center or core strand or wire be eliminated and that the cable be constituted by the grouped strands laid in the hereinbefore described long pitch, fixedly connected at their opposite or free ends.

In the manufacture of my cable or motion transmitting member, it is entirely possible and practicable that the same shall be produced in continuous lengths, the same as conventional cable, though with such manufacture, temporary clamping devices or clamping means or their equivalents, should be attached or applied thereto on each side of a point or points where it is to be cut, in order that the aforesaid helical formation will be held until permanent fastening of the cut ends is effected.

I claim:

1. A motion transmitting member, comprising a center strand, tensional spring strands lying circumferentially about and along the center strand at an acute angle to the center strand whereby said spring strands have a relatively long pitch, and means for securing the strands at their opposite ends to retain them under tension.

2. A motion transmitting member, comprising a center spring strand, auto-adjustable non-setting, tensioned spring strands lying circumferentially about and along the center spring strand at an acute angle to the center strand whereby said tensioned spring strands have a relatively long pitch and means for securing the strands at their opposite ends to retain them under tension.

3. A motion transmitting member comprising a flexible core, a plurality of tensioned wire strands lying helically about and along the core at an acute angle to said core whereby the strands have a relatively long pitch, said strands being movable intermediately of their opposite ends with relation to the core, and means for securing the strands at their opposite ends to retain them under tension.

4. A motion transmitting device, comprising a flexible center strand, a plurality of tensioned spring strands lying circumferentially and freely about and along the center strand at an acute angle to said center strand whereby said spring strands have a relatively long pitch, means for securing the spring strands at their opposite ends to retain them under tension, and a flexible casing slidably receiving all of said strands therethrough.

RALPH M. HETTINGA.

REFERENCES CITED

The following references are of record in the file of this patent:

UNITED STATES PATENTS

| Number | Name | Date |
|---|---|---|
| 301,888 | Hazelton | July 15, 1884 |
| 1,643,150 | Conner | Sept. 20, 1927 |
| 1,939,766 | Corset | Dec. 19, 1933 |

UNITED STATES PATENTS

| Number | Country | Date |
|---|---|---|
| 442,214 | Great Britain | Jan. 27, 1936 |
| 459,874 | Great Britain | Jan. 18, 1937 |